(12) United States Patent
Brøgger et al.

(10) Patent No.: US 10,455,980 B2
(45) Date of Patent: Oct. 29, 2019

(54) DISPOSABLE GRILL

(71) Applicant: Novo Futura IVS, Espergærde (DK)

(72) Inventors: Carsten Nygaard Brøgger, Espergærde (DK); Knud Hellek Finken, Veksø Sjælland (DK)

(73) Assignee: NOVO FUTURA IVS, Espergærde (DK)

( * ) Notice: Subject to any disclaimer, the term of this patent is extended or adjusted under 35 U.S.C. 154(b) by 0 days.

(21) Appl. No.: 15/570,496

(22) PCT Filed: Apr. 29, 2015

(86) PCT No.: PCT/DK2015/050111
§ 371 (c)(1),
(2) Date: Oct. 30, 2017

(87) PCT Pub. No.: WO2016/173597
PCT Pub. Date: Nov. 3, 2016

(65) Prior Publication Data
US 2018/0140133 A1 May 24, 2018

(51) Int. Cl.
*A47J 37/07* (2006.01)
*A47J 37/06* (2006.01)

(52) U.S. Cl.
CPC ................................. *A47J 37/0768* (2013.01)

(58) Field of Classification Search
CPC .................. A47J 37/06; A47J 37/067; A47J 37/0688–0694; A47J 37/07–0704; A47J 37/0763–0768
See application file for complete search history.

(56) References Cited

U.S. PATENT DOCUMENTS

| 4,432,340 A * | 2/1984 | Conant | A47J 36/02 |
| | | | 126/390.1 |
| 4,719,899 A * | 1/1988 | Burkhart | A47J 37/0768 |
| | | | 126/152 B |
| 8,663,774 B2 * | 3/2014 | Fernando | B32B 5/24 |
| | | | 428/421 |
| 2013/0312732 A1 * | 11/2013 | Brennan | A47J 37/07 |
| | | | 126/25 R |

(Continued)

FOREIGN PATENT DOCUMENTS

| CN | 2386748 Y | 7/2000 |
| CN | 201303870 Y | 9/2009 |

(Continued)

OTHER PUBLICATIONS

English translation of DE202012004383 to Meissner, published Aug. 30, 2012.*

(Continued)

*Primary Examiner* — Michael A Laflame, Jr.
(74) *Attorney, Agent, or Firm* — Cantor Colburn LLP

(57) ABSTRACT

Disclosed is a disposable grill (1) comprising a base tray (2) at least including a bottom part (3), one or more sidewalls (4) protruding upwards from the bottom part (3) and a top opening (5). The disposable grill (1) further comprises grate means (6) adapted to cover at least a part of the top opening (5), wherein the bottom part (3) and the one or more sidewalls (4) are formed by a biodegradable material, and wherein the disposable grill (1) further comprises at least one fireproof thermal insulating insert (7) arranged in the base tray.

20 Claims, 3 Drawing Sheets

(56) References Cited

U.S. PATENT DOCUMENTS

Figure 1:
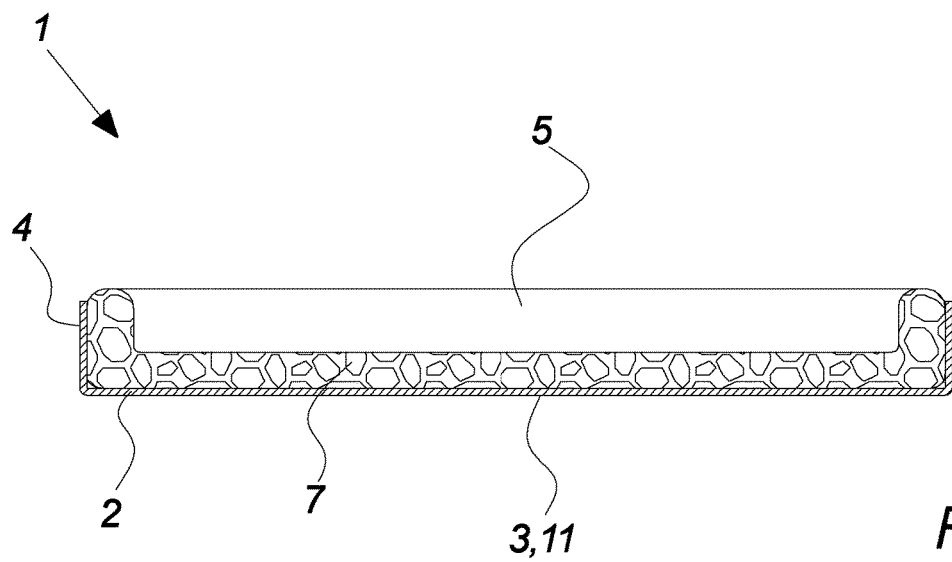

2014/0261393 A1\* 9/2014 Witzel ............... A47J 37/0713
126/9 B

FOREIGN PATENT DOCUMENTS

| | | |
|---|---|---|
| CN | 201404101 Y | 2/2010 |
| DE | 202012004383 A1 | 10/2012 |
| EP | 2662005 A2 | 11/2013 |
| GB | 2503647 A | 1/2014 |
| JP | 3039824 U | 5/1997 |
| WO | 9415152 A1 | 7/1994 |
| WO | 2014146661 A1 | 9/2014 |

OTHER PUBLICATIONS

International Preliminary Report on Patentability for corresponding application PCT/DK2015/050111 filed Apr. 29, 2015; Report dated Mar. 24, 2017.
International Search Report for corresponding application PCT/DK2015/050111 filed Apr. 29, 2015; dated Jan. 22, 2016.
Written Opinion for corresponding application PCT/DK2015/050111 filed Apr. 29, 2015; dated Jan. 22, 2016.
Chinese Office Action for corresponding Chinese Patent Application No. 201811450739.7; Application Date: Apr. 29, 2015; Office Action dated Jul. 4, 2019.
Japanese Office Action for corresponding application 2017-555665; dated May 21, 2019.

\* cited by examiner

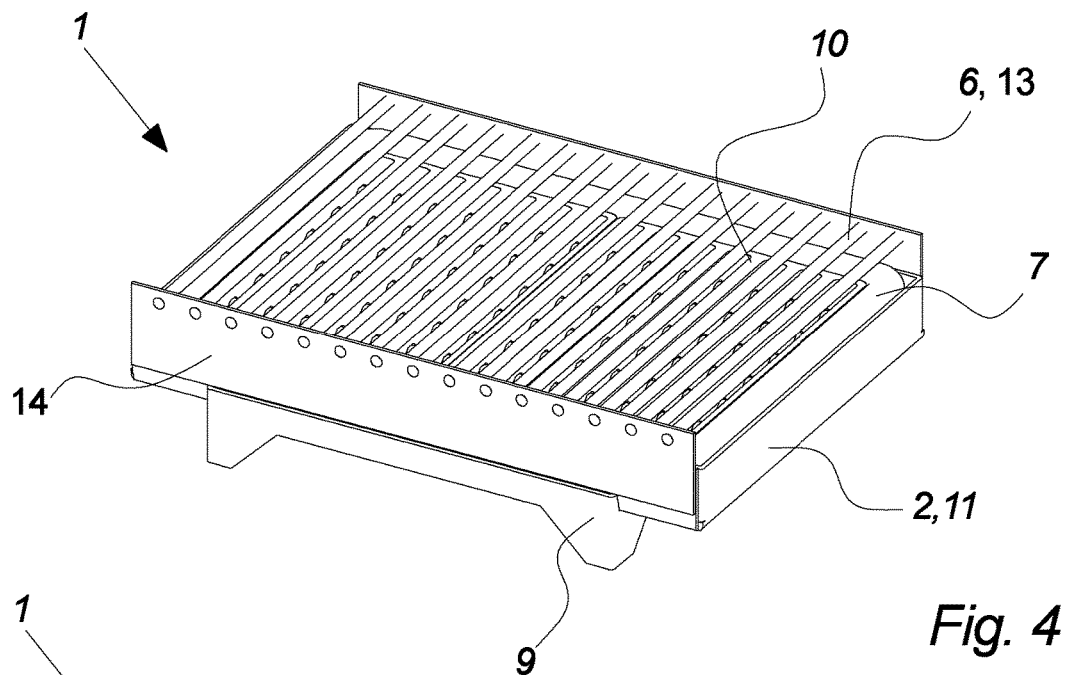
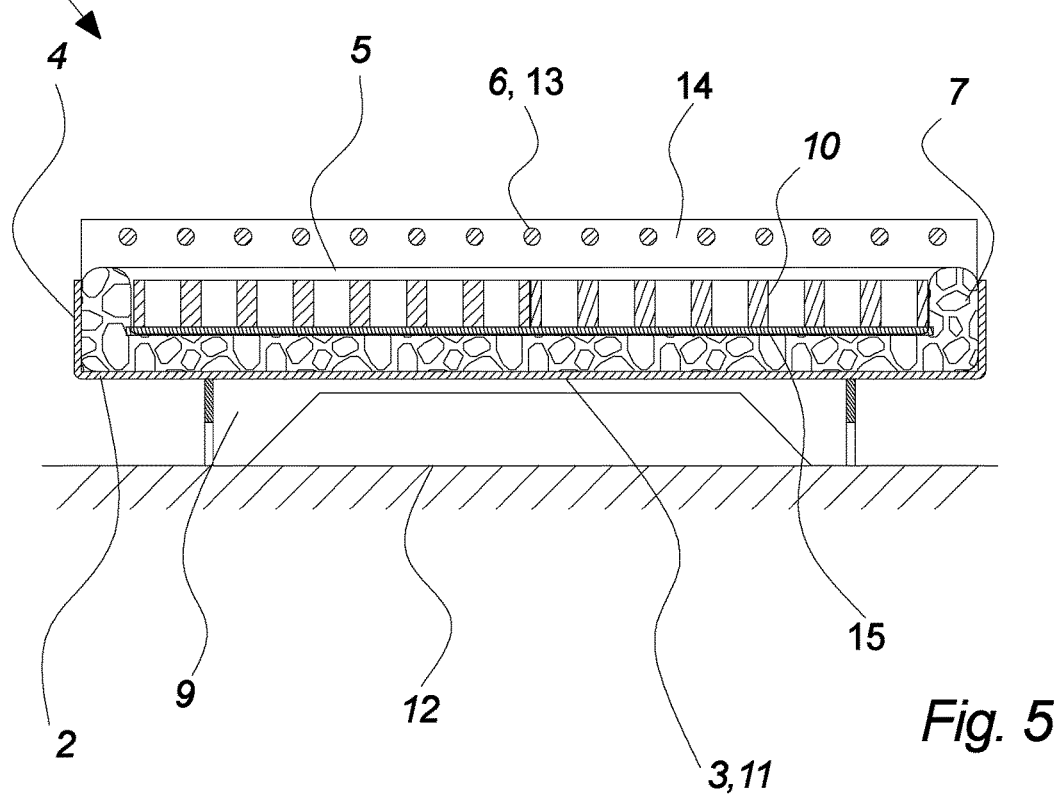

DISPOSABLE GRILL

FIELD OF THE INVENTION

The invention relates to a disposable grill comprising a base tray at least including a bottom part, one or more sidewalls protruding upwards from the bottom part and a top opening. The disposable grill further comprises grate means adapted to cover at least a part of the top opening.

BACKGROUND OF THE INVENTION

Disposable grills have been known in the art for years. Such one-time grills usually comprise a base tray made from thin aluminium plate, which is pre-filled with charcoal and covered by a thin metal grate.

Such disposable grills are convenient to use when hiking, on the beach and elsewhere outdoors where you want to grill without bringing along or investing in a traditional grill.

However, after use the disposable grill is still hot and therefore difficult to dispose of properly. Thus, the disposable grill is often left in the nature where it takes a very long time to decompose.

Thus, from the International patent application WO 2014/146661 it is known to form a disposable grill from a flammable material to ensure that the grill will burn out during and after use. However, the burning of the grill can be difficult to control and there is a risk of the grill damaging the surrounding or even accidentally starting a fire.

An object of the present invention is therefore to provide for a safer environmentally friendly disposable grill.

THE INVENTION

The invention provides for a disposable grill comprising a base tray at least including a bottom part, one or more sidewalls protruding upwards from the bottom part and a top opening. The disposable grill further comprises grate means adapted to cover at least a part of the top opening, wherein the bottom part and the one or more sidewalls are formed by a biodegradable material, and wherein the disposable grill further comprises at least one fireproof thermal insulating insert arranged in the base tray.

Forming the base tray in a biodegradable material is advantageous in that the base tray hereby will decompose within a short period of time even if the grill is left behind in nature after use. However, biodegradable materials suited for forming a base tray of a disposable grill are flammable—often even at relatively low temperatures—and/or they will at least be damaged by the high temperature generated during the grilling process.

It is therefore advantageous to arrange a fireproof thermal insulating insert in the base tray so that the base tray is protected from exposure to high temperatures during use of the disposable grill. Furthermore, the double (or multi) layer design and particularly the fireproof thermal insulating insert will also aid in protecting the underlying ground from being damaged by the high temperatures in the grill during use and it will make the disposable grill safer to use also for the user since the risk of being burned when touching an outside surface of the grill during use is severely reduced.

Providing the base tray with walls is advantageous in that the walls will aid in positioning and/or fixating the thermal insulating insert both during transport and use. Furthermore the walls will ensure that charcoal or a similar combustible heat source placed in the fireproof thermal insulating insert in the base tray does not fall out and they will ensure that embers or the like does not fall out of the grill and damage the surrounding.

It should be emphasised that the term "grate means" in this context should be interpreted as any kind of grid, mesh, grille, lattice, screen or any other kind of grate suitable for placing over the heat source of a disposable grill while carrying the food to be grilled. The grate means could be formed as a number of mutually connected individual parts, as a single part, as a number of single parts or any combination thereof.

It should also be emphasised that the term "biodegradable material" in this context should be interpreted as any kind of material capable of being consumed by microorganisms (bacteria, fungi or other biological means) and return to compounds found in nature, within a reasonably short period of time after customary disposal—i.e. any kind of material capable of completely breaking down and return to nature typically within no more than two years after customary disposal and preferably within no more than one year after customary disposal or when left behind in nature.

Furthermore, in this context the term "thermal insulating insert" is to be understood as any kind of device, means, arrangement or other made from a material capable of significantly lowering the thermal conductivity. Such insulating material include any kind of material having a low thermal conductivity i.e. typically below 0.5 watts per meter kelvin (W·m−1·K−1) such as mineral wool or foam, ceramic insulation tiles, glass foam, polyurethane foam, paper, expanded polystyrene, expanded clay, amorphous volcanic glass, slag or other or any combination thereof. However to also be fireproof some of the listed materials would have to be coated or otherwise treated with one or more fire-retardants' or be mixed or coated with other materials ensuring the fireproof quality of the insert.

Also, in this context the term "fireproof . . . insert" is to be understood as any kind of device, means, arrangement or other made from a incombustible and/or non-flammable material i.e. a material that do not burn or will only burn at very high temperatures e.g. temperatures over 500 degrees Celsius or typically even higher—and/or a material not able to catch fire.

In an aspect of the invention, the at least one thermal insulating insert is adapted to fit the bottom part and/or one or more sidewalls inside the base tray.

Forming the insert so that it fits inside the base tray is advantageous in that it makes the grill more compact and it reduces the risk of damaging the insert—e.g. during transport.

In an aspect of the invention, the at least one thermal insulating insert is formed by a granulate material.

Forming the thermal insulating insert by a granulate material is advantageous in that granulate material is lighter than solid material—which is particularly advantageous in relation to a disposable grill—and it that the thermal insulating quality of a granulate material is typically significantly better than a solid material.

In an aspect of the invention, the granulate material is arranged in one or more granulate containers.

Arranging the granulate material in granulate containers is advantageous in that it hereby is possible to control or even fix the position of the granulate e.g. during transportation but e.g. also during use. Furthermore, after use the granulate will quickly dissipate and become "part of nature".

In an aspect of the invention, the mutual position of at least some of the granulate material is fixed by means of a binder.

Mixing a binder into the granulate material is advantageous in that the insert hereby can be formed more dimensionally stabile.

In an aspect of the invention, the at least one thermal insulating insert is formed by one or more coherent tile means.

Forming the insert from tiles is advantageous in that it simplifies the assembly process and ensures a dimensionally stable insert.

In an aspect of the invention, the at least one thermal insulating insert is connected to the bottom part and/or the one or more sidewalls.

Attaching the insert to the walls and/or the bottom part of the base tray is advantageous in that this will ensure that the position of the insert is fixed in relation to the base tray.

In an aspect of the invention, said at least one thermal insulating insert is formed by a material having a bulk density of less than 2,000 kg/m$^3$, preferably less than 500 kg/m$^3$, and most preferred less than 150 kg/m$^3$.

Since a disposable grill by nature is intended to be transported just before use and will often have to be transported to a waste bin after use it is advantageous that the insert is as light as possible. Thus, the above ranges present advantageous weight limits in relation to disposable grills.

In an aspect of the invention, said at least one thermal insulating insert is formed by a material having a ratio between bulk density (measured in kg/m$^3$) and thermal conductivity (measured in watts per meter kelvin (W/m·K)) of less than 20,000, preferably less than 10,000, and most preferred less than 1,000.

If the density of the insert material is too high the insert becomes too heavy and difficult to transport around and if the thermal conductivity of the material is too high the risk of igniting or damaging the base tray or an underlying surface is increased. Thus the present ratio ranges present advantageous limits in relation to density and thermal conductivity.

In an aspect of the invention, the at least one thermal insulating insert is formed as a single coherent part.

Forming the insert is formed as a single coherent part is advantageous in that it simplifies assembly.

In an aspect of the invention, the bottom part and the one or more walls of the base tray is formed monolithic by the biodegradable material.

Forming the bottom part and the walls as one single piece is advantageous in that this enables that the entire base tray can be made in a single manufacturing process, hereby reducing production time and cost. Furthermore, forming the bottom part and the walls monolithic also ensures a strong and stable base tray design capable of carrying the load of the food to be grilled without collapsing.

In an aspect of the invention, the grate means are also formed by a biodegradable material.

Also forming the grate means from biodegradable material is advantageous in that also the grate means will decompose and return to nature relatively quickly if left in nature.

In an aspect of the invention, the base tray is made from one or more organic materials.

In an aspect of the invention, the grate means is made from one or more organic materials.

Forming the base tray and/or the grate means from organic material is advantageous in that such material is easily biodegradable and will therefore quickly decompose—thus making the grill more environmentally friendly.

In this context the term "organic material" (also known as organic matter, natural organic matter, NOM) should be understood as material composed of organic compounds that has come from plants and animals, from the remains of organisms such as plants and animals and their waste products in the environment.

In an aspect of the invention, the thermal insulating insert is made from one or more natural materials.

Making the insert from a natural material is advantageous in that the insert will not have an adverse impact on the environment e.g. if left in the nature.

It should be emphasised that the term "natural material" in this context should be interpreted as any product or physical matter that comes from plants, animals, or the ground. Minerals are also considered to belong into this category. Natural materials include material such as flint, granite, obsidian, perlite, sandstone, sand, gems, glass, clay, porcelain and soil.

In an aspect of the invention, the biodegradable material is substantially carbon neutral.

Forming the main element of the disposable grill from a material that is substantially carbon dioxide (CO2) neutral is advantageous in that the grill thereby is environmentally friendly, since the decomposing (or combustion) of it will not adversely affect the environment.

It should be noted that the term "carbon neutral" is a term used to describe matter that neither contribute to nor reduce the amount of carbon (measured in the release of carbon dioxide) into the atmosphere.

In an aspect of the invention, the disposable grill further comprises a base adapted to function as a spacer between an outside surface of the bottom part of the base tray and the underlying ground.

Providing spacing means in the form of a base that can lift the grill off the underlying ground during the grilling process is advantageous in that it reduces the risk of the grill damaging the surrounding and it reduces the risk of the grill igniting the surroundings.

In an aspect of the invention, the base is formed by a biodegradable material.

Forming the base from a biodegradable material is advantageous in that also the base will decompose and return to nature relatively quickly if left in nature.

In an aspect of the invention, the base tray and the base are formed by substantially the same biodegradable material.

Forming the base tray and the base from the same biodegradable material is advantageous in that it simplifies production and logistics.

In an aspect of the invention, the base tray is formed by moulding.

Forming the base tray by means of moulding is advantageous in that it hereby is possible to provide the elements of the grill with a complex design in a relatively inexpensive way.

In an aspect of the invention, the moulding is compression moulding.

Using compression moulding to form elements of the grill is advantageous in that this manufacturing process enables that the elements may be formed by a multitude of biodegradable materials—substantially without additional material added (such as binders, adhesive or other)—hereby making it easier and more inexpensive to manufacture the disposable grill and make it environmentally friendly.

In an aspect of the invention, the biodegradable material is selected from the group consisting of wood, bamboo, corncobs, coconut shell, straw, seeds, grains, corn, sugarcane, elephant grass, nutshell, leafs, plants, biodegradable plastic, plant based starch, charcoal, paper and cardboard.

Hereby is achieved an advantageous embodiment of the invention.

In an aspect of the invention, the base tray contains a combustible heat source arranged to grill food placed on the grate means during normal use of the disposable grill.

Arranging a combustible heat source inside the grill—preferably inside the insert—is advantageous in that the heat source hereby is readily available.

In an aspect of the invention, the autoignition temperature of the biodegradable material is between 100° C. and 650° C., preferably between 200° C. and 550° C. and most preferred between 250° C. and 500° C.

If the biodegradable material autoignite at too low a temperature the biodegradable material could catch fire during normal use of the grill. If the autoignition temperature of the biodegradable material is too high the biodegradable material might take too long to decompose. Thus, the present temperature ranges provides for an advantageous relationship between function and efficiency.

It should be emphasised that the term "autoignition temperature" (also called kindling point) in this context should be interpreted as the lowest temperature at which a substance will spontaneously ignite in a normal atmosphere without an external source of ignition, such as a flame or spark. This temperature is required to supply the activation energy needed for combustion. I.e. the autoignition temperature is the lowest temperature at which a combustible substance when heated takes fire in air and continues to burn.

In an aspect of the invention, the at least one thermal insulating insert is at least partly made from perlite.

Forming the thermal insulating insert from perlite is advantageous in that perlite in expanded form is an inexpensive, light, fireproof material with a low thermal conductivity making it particularly suited for use in relation with a disposable grill.

FIGURES

Figure 2:
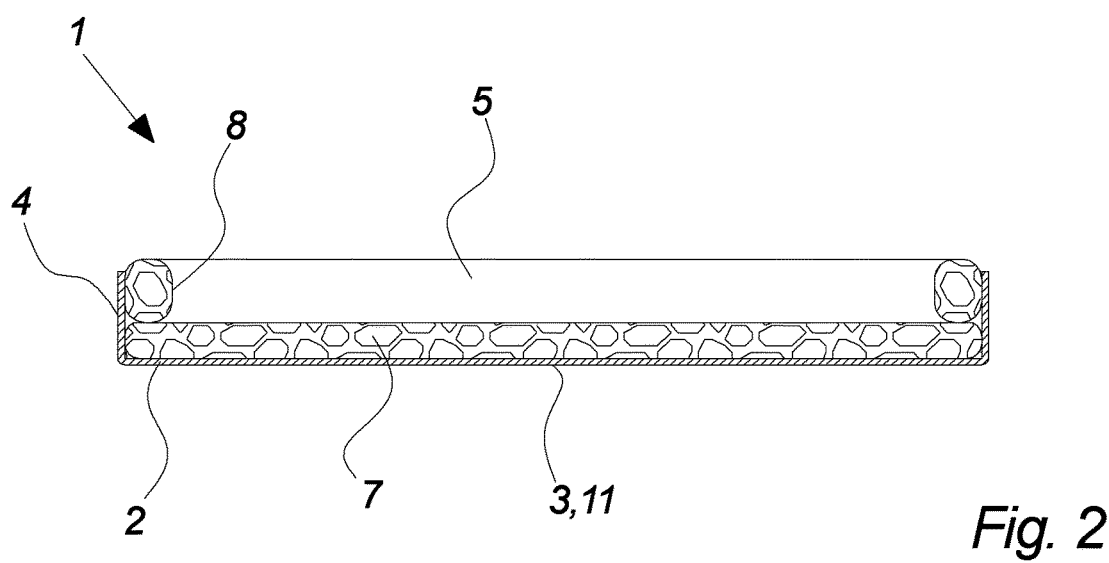
Figure 3:
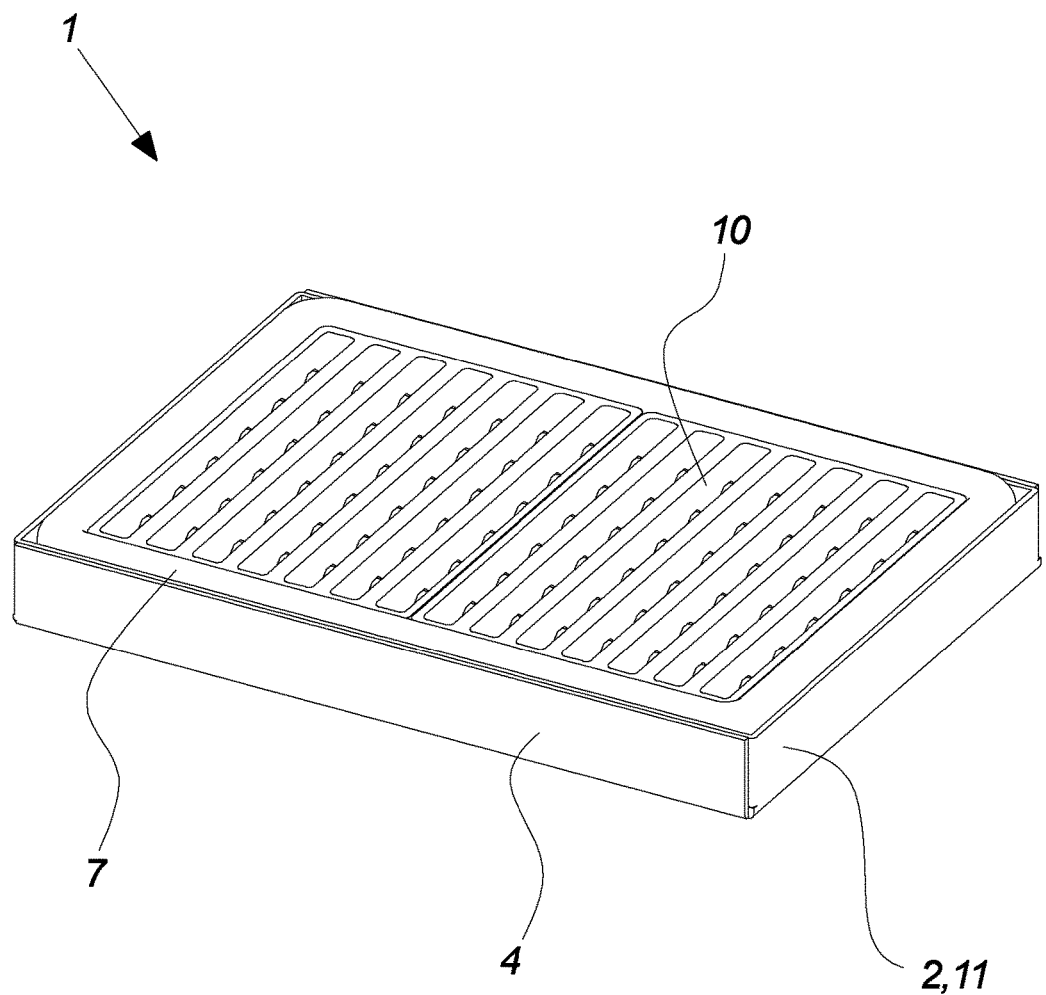

The invention will be described in the following with reference to the figures in which FIG. 1 illustrates a cross section through the middle of a disposable grill comprising a coherent insert, as seen from the side, FIG. 2 illustrates a cross section through the middle of a disposable grill comprising an insert including granulate containers, as seen from the side, FIG. 3 illustrates a disposable grill without grate means, as seen in perspective, FIG. 4 illustrates a disposable grill with grate means and base, as seen in perspective, and FIG. 5 illustrates a cross section through the middle of a disposable grill with grate means and base, as seen from the side.

DETAILED DESCRIPTION

FIG. 1 illustrates cross section through the middle of a disposable grill comprising a coherent insert, as seen from the side.

In this embodiment the disposable grill 1 comprises a base tray 2 encasing a fireproof thermal insulating insert 7. In this embodiment the base tray 2 comprises a substantially flat rectangular bottom part 3 but in another embodiment the bottom part 3 could be formed curved or partly curved and the shape could be round, oval, square, polygonal or another more or less complex shape.

In this embodiment the base tray 2 further comprises four walls 4 protruding upwards from the bottom part 3 to form a top opening 5. However, in another embodiment the base tray 2 could comprise another number of walls 4 such as one, two, three, five, six, eight or more.

In this embodiment the entire base tray 2 is formed as one monolithic piece by compression moulding. However, in another embodiment the base tray 2 could be formed monolithically by moulding of a more or less liquid mass of biodegradable material, it could be machined from a single block or it could be made in a number of other ways. In another embodiment the base tray 2 could also be formed by several separate parts e.g. assembled by means of natural resin, plaiting, meshing, organic nails, dowels, wedges or the like.

In this embodiment the base tray 2 is made from cardboard, in that cardboard is biodegradable—typically within 2 month if left outside in nature —, light and relatively inexpensive. However, in another embodiment of the invention the base tray 2 could be made from a multitude of other materials e.g. dependent on the specific production method, on the biodegradability of the material, on the specific use and/or on how environmentally friendly the disposable grill 1 shall be.

In many cases biodegradable material suited for forming base tray 2 of a disposable grill 1 will also be flammable. I.e. the autoignition temperature of the biodegradable material—which in this case is cardboard—is around 427 degrees Celsius but in another could be both higher and lower.

It should also be emphasised that the term "flammable material" in this context should be interpreted as a material capable of being relatively easily ignited and of burning relatively quickly so as to aid in the heat generation during use of the disposable grill and/or so that the flammable material can catch fire during use of the grill.

In this embodiment the bottom part 3, the walls 4 and the insert 7 are formed substantially solid but in another embodiment the walls 4, the bottom part 3 and/or the insert 7 could be provided with one or more orifices e.g. to ensure proper air supply to the combustion process in the grill 1 or for other purposes.

In this embodiment the fireproof thermal insulating insert 7 is formed as a single coherent part—i.e. the insert 7 could be formed as a moulded part, it could be machined as one piece or other.

In another embodiment spacers (not shown) could be provided between the base tray 2 and the thermal insulating insert 7—particularly between the bottom part 3 and the thermal insulating insert 7—to increase the thermal insulating quality or the grill design and/or to reduce weight.

In this embodiment the grill basically only consist of two layers—i.e. the single layer base tray 2 and the single layer insert 7. However in another embodiment one or both of these could comprise more than one layer e.g. of different material and/or further layer could be arranged inside, outside and/or between the base tray 2 and the thermal insulating insert 7.

In this embodiment the insert 7 is formed by granulate material held together by means of a binder—preferably an organic binder such as "glue" made from an animal source or a gum made from a vegetative source. Preferably the binder is also water-soluble so that the structure of the insert deteriorates if the insert is left outside in nature.

In this embodiment the granulate material is expanded perlite which is a naturally occurring volcanic rock material having a density of around 70 kg/m$^3$—making it relatively light—and a thermal conductivity of around 0.035 W/m·K— ensuring a relatively high thermal insulating effect—that the ratio between the bulk density (measured in kg/m$^3$) and thermal conductivity (measured in watts per meter kelvin (W/m·K) in this case is around 2000. However, since perlite is a found in nature the density and the thermal conductivity for this specific material may be both bigger and smaller for specific batches.

In another embodiment the insert 7 could be made from another natural material such as expanded vermiculite, Gypsum, Calcium silicate, Leca or any other type of fireproof rock or mineral material or any combination thereof. Leca is a trademark name for a material formed by lightweight expanded clay. Leca is formed by heating and firing natural marine clay in rotary kiln at temperatures up to 1150 degrees centigrade.

In another embodiment the insert 7 could also or instead be made from e.g. wood, compressed straw material, a cardboard construction or another natural and/or organic and/or biodegradable material having low thermal conductivity. Such materials would in most cases would have to comprise some sort of inner fireproof layer or coating—such as a layer of clay material—or would have to be mixed with a fireproof material or would in another way be treated with a fire retardant ensuring the fireproof quality of the insert 7.

FIG. 2 illustrates cross section through the middle of a disposable grill 1 comprising an insert 7 including granulate containers 8, as seen from the side.

In this embodiment the insert 7 is formed by granulate material which is not held together by means of a binder. Instead the granulate material is placed in granulates containers 8—basically formed as bags—which will restrain the granulate in substantially fixed positions. In this embodiment the granulates containers 8 are formed from a flammable material so that when the grill is in use the granulates containers 8 will quickly burn and the insert is then transformed to a loose granulate material.

To ensure the position of the insert 7 during transportation and other the insert 7—i.e. in this case the granulate containers 8—is connected to the inside surface of the base tray 2 by means of an adhesive.

In another embodiment the granulates containers 8 could be formed as a inner tray (not shown) so that the loose granulate material would be arranged and contained in the cavity formed between the base tray 2 and this inner tray or the position of the granulate material may in another way be secured by geometrical fit. I.e. in an embodiment the insert 7 may be formed by a more rigid hollow container 8—e.g. a cardboard box—filled with fireproof thermal insulating granulate material.

FIG. 3 illustrates a disposable grill 1 without grate means 6, as seen in perspective.

In this embodiment the disposable grill 1 is supplied pre-filled with a separate combustible heat source 10 which in this case is a charcoal material specifically given the inside shape of the insert 7 in that the heat source 10 is formed as walls extending across the width of the insert 7. However, in another embodiment the combustible heat source 10 could be another type of coal, it could be plant material such as wood, shells or other organic material and/or the combustible heat source 18 could be formed as traditional coals or have another shape.

FIG. 4 illustrates a disposable grill 1 with grate means 6 and base 9, as seen in perspective, and FIG. 5 illustrates a cross section through the middle of a disposable grill with grate means and base, as seen in perspective In this embodiment the grate means 6 are formed by rods 13 made from bamboo which are fixed by endplates 14 made from balsa wood. However in another embodiment the rods 13 and/or the endplates 14 could be made from another material such as compressed straw material, a mineral material, metal or other or any combination thereof.

In another embodiment the grate means 6 could also or instead be formed by a plate comprising a number of orifices In this embodiment the bamboo sticks 13 acting as a grate is substantially unprocessed and untreated. However in another embodiment the grate means 6 could on the top surface be provided with some sort of substantially grease impermeable surface coating and/or on the bottom surface or the rods 13 could be provided with some sort of substantially fireproof surface coating to ensure that the grate means lasts at least as long as grill is functional. I.e. a substantially grease impermeable surface coating could be provided to ensure that grease from the grilled food is not absorbed by the grate means 6 and thus increase the risk of the grate means catching on fire or at least catching on fire too soon. However, in another embodiment the substantially grease impermeable surface coating, another surface coating or an additional surface coating could also ensure that the grilled food does not burn and get stuck to the grate means 6 or the coating or coatings could ensure a more hygienic top surface. The grease impermeable surface coating could e.g. formed by a thin layer of silica or the grease impermeable surface coating could be made from sand, concrete, glass or any other kind of glazing or another material suited for this purpose.

The above mentioned fireproof surface coating could be made from hardened clay or the fireproof surface coating could be made from sand, concrete, silica, glass or any other natural material suited for forming a fireproof surface coating.

Also in another embodiment the grate means 6 or at least the top surface of the grate means 6 could made from a substantially grease impermeable material such as hardwood, highly compressed natural material, metal or the like.

In this embodiment the disposable grill 1 is further provided with a base 9 adapted to function as a spacer between the outside surface 11 of the bottom part 3 of the base tray 2 and the underlying ground 12 and thus lift the base tray 2 off the underlying ground 12 at least during use of the grill 1.

In this embodiment the base 9 is formed by a foldable cardboard structure placed between the base tray 2 and the underlying ground 12 but in another embodiment the base 9 could be attached to the base tray 2 of the grill 1 or it could be formed integrally with the base tray 2 or the grate means 6.

In this embodiment the base tray 2 and grate means 6 are formed as separate and individual parts which are advantageous in that the two hereby can be manufactured separately by individually suited methods and only subsequently be assembled to form part of the disposable grill. However, in another embodiment the base tray 2 and grate means 6 could be formed as an integral part.

In this embodiment the combustible heat source 10 comprises a bottom sheet 15 onto which the rest on the combustible heat source 10 is attached to fix the mutual positions of the different parts of the combustible heat source 10. Furthermore the bottom sheet 15 will aid in reducing the temperature on the outside surface 11 of the base tray 2. In this embodiment the bottom sheet 15 made from cardboard but in another embodiment the bottom sheet 15 could be made from wood, compressed straw material, a mineral material or other or any combination thereof.

In an embodiment the bottom sheet 15 could act as a firelighter or at least aid in igniting the combustible heat source 10.

The invention has been exemplified above with reference to specific examples of disposable grills 1, base trays 2, grate means 6 and other. However, it should be understood that the invention is not limited to the particular examples described above but may be designed and altered in a multitude of varieties within the scope of the invention as specified in the claims.

LIST

1. Disposable grill
2. Base tray
3. Bottom part
4. Wall
5. Top opening
6. Grate means
7. Fireproof thermal insulating insert
8. Granulate container
9. Base
10. Combustible heat source
11. Outside surface of base tray
12. Underlying ground
13. Rod
14. Endplate
15. Bottom sheet

The invention claimed is:

1. A disposable grill comprising
    a base tray at least including a bottom part, one or more sidewalls protruding upwards from said bottom part and a top opening,
    a grate adapted to cover at least a part of said top opening,
    wherein said bottom part and said one or more sidewalls are formed by a biodegradable material,
    wherein said disposable grill further comprises at least one fireproof thermal insulating insert arranged in said base tray, and
    wherein said at least one thermal insulating insert is in direct contact with one or more sidewalls inside said base tray.

2. The disposable grill according to claim 1, wherein said at least one thermal insulating insert is adapted to fit said bottom part inside said base tray.

3. The disposable grill according to claim 1, wherein said at least one thermal insulating insert is formed by a granulate material.

4. The disposable grill according to claim 3, wherein said granulate material is arranged in one or more granulate containers.

5. The disposable grill according to claim 3, wherein the mutual position of at least some of said granulate material is fixed by means of a binder.

6. The disposable grill according to claim 1, wherein said at least one thermal insulating insert is formed by one or more coherent tiles.

7. The disposable grill according to claim 1, wherein said at least one thermal insulating insert is connected to said bottom part and/or said one or more sidewalls.

8. The disposable grill according to claim 1, wherein said at least one thermal insulating insert is formed by a material having a bulk density of less than 2,000 kg/m$^3$.

9. The disposable grill according to claim 1, wherein said at least one thermal insulating insert is formed by a material having a ratio between bulk density (measured in kg/m$^3$) and thermal conductivity (measured in watts per meter kelvin (W/m·K)) of less than 20,000.

10. The disposable grill according to claim 1, wherein said at least one thermal insulating insert is formed as a single coherent part.

11. The disposable grill according claim 1, wherein said bottom part and said one or more walls of said base tray is formed monolithic by said biodegradable material.

12. The disposable grill according claim 1, wherein said grate is also formed by a biodegradable material.

13. The disposable grill according to claim 1, wherein said base tray is made from one or more organic materials.

14. The disposable grill according to claim 1, wherein said grate is made from one or more organic materials.

15. The disposable grill according to claim 1, wherein said thermal insulating insert is made from one or more natural materials.

16. The disposable grill according to claim 1, wherein said disposable grill further comprises a base adapted to function as a spacer between an outside surface of said bottom part of said base tray and the underlying ground.

17. The disposable grill according to claim 16, wherein said base is formed by a biodegradable material.

18. The disposable grill according to claim 1, wherein said biodegradable material is selected from the group consisting of wood, bamboo, corncobs, coconut shell, straw, seeds, grains, corn, sugarcane, elephant grass, nutshell, leaf, plants, biodegradable plastic, plant based starch, charcoal, paper and cardboard.

19. The disposable grill according to claim 1, wherein said base tray contains a combustible heat source arranged to grill food placed on said grate during normal use of said disposable grill.

20. The disposable grill according to claim 1, wherein the autoignition temperature of said biodegradable material is between 100° C. and 650° C.

* * * * *